(No Model.)
F. C. FEICKER.
FORK GUARD.
No. 384,900. Patented June 19, 1888.
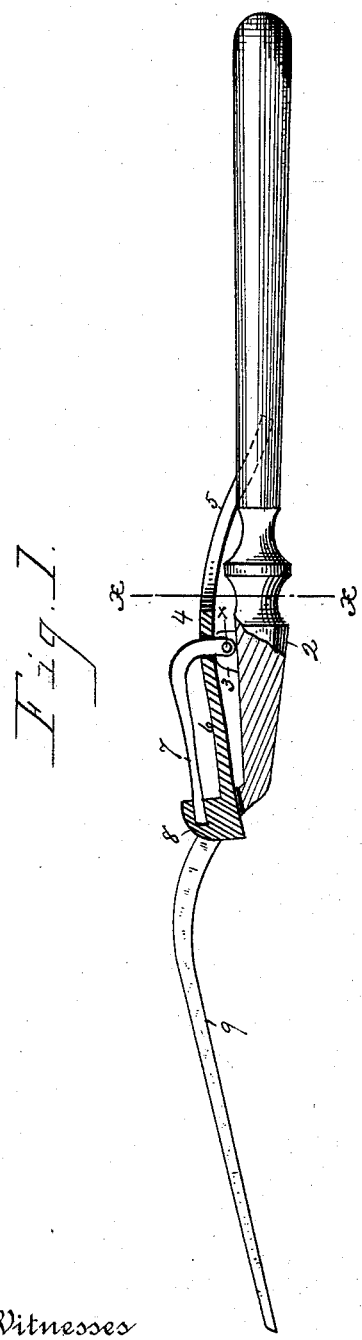
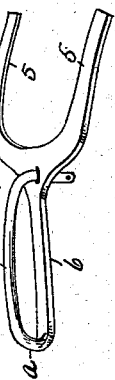
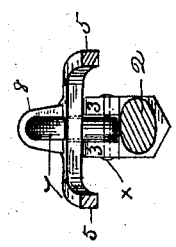
Witnesses
Inventor,
Frederick C. Feicker,
By his Attorneys

United States Patent Office.

FREDRICK C. FEICKER, OF NORTHAMPTON, MASSACHUSETTS, ASSIGNOR TO THE NORTHAMPTON CUTLERY COMPANY, OF SAME PLACE.

FORK-GUARD.

SPECIFICATION forming part of Letters Patent No. 384,900, dated June 19, 1888.

Application filed April 4, 1888. Serial No. 269,634. (No model.)

*To all whom it may concern:*

Be it known that I, FREDRICK C. FEICKER, a citizen of the United States, residing at Northampton, in the county of Hampshire and State of Massachusetts, have invented new and useful Improvements in Fork-Guards, of which the following is a specification.

This invention relates to fork-guards, and particularly to that class thereof having a pivotal connection with the shank of the fork, the object being to provide a guard of improved construction; and the invention consists in the peculiar construction and arrangement of the fork-guard and the means for connecting the same to the fork shank, all as hereinafter fully described, and pointed out in the claim.

In the drawings forming part of this specification, Figure 1 is a side elevation, partly in section, of a fork and of a guard, the latter being constructed according to my improvements. Fig. 2 is a transverse section of the shank of the fork, on the line $x\,x$, Fig. 1, to the rear of the guard-pivot thereon, and showing the guard in rear end elevation. Fig. 3 is a perspective view of the guard, illustrating a slightly modified construction thereof as compared with that shown in Fig. 1.

In the drawings, 2 is the shank of the fork, and that part thereof adjoining the rear end of the fork-tines 9 is shown in section in Fig. 1, only one of said tines being shown. The upper side of the fork-shank 2 is provided with the usual cheek-pieces, 3, between which an ordinary fork-guard is sometimes pivoted, a pivot-pin, $x$, passing transversely through said cheek-pieces, and the upper edges of the latter are in substantially a plane with the upper side of the fork-shank 2.

The fork-guard 4 consists of the legs 5 and a forwardly-extending arm, 6, and an elastic extension, 7, of said arm, either integral therewith, as shown in Fig. 3, or rigidly secured by one end to a boss, 8, on the forward end of said arm 6, as shown in Fig. 1, and the unattached end of said elastic extension 7 is made to pass loosely through a perforation in the guard about midway between said legs and the arm 6, and has through its end a perforation to permit of passing a pivot-pin therethrough, as shown in Figs. 1 and 2.

In making the guard 4 with the boss 8 on the end of its arm, as shown in Fig. 1, said boss is forged thereon, or consists of a piece of metal brazed or otherwise suitably secured to the end of the arm, and its side opposite the handle of the fork is perforated to receive the spring-extension 7, the end of the latter being secured in said boss rigidly by brazing or other suitable means.

When the guard is made in the manner illustrated in Fig. 3, its spring-extension 7 is reduced to the desired form before it is given that shown in said figure—that is to say, before being bent from a substantially straight line—and by heating the arm 6 at the point $a$, Fig. 3, said extension is bent over, and the end thereof is passed through said perforation in the guard, as shown. In adjusting the pivoted end of said spring arm or extension 7, preparatory to attaching the guard to the fork, said pivoted end is arranged to extend through the body of the guard and between the cheek-pieces 3 on the shank 2 of the fork, and in order to bring the perforation through the end of said spring-extension 7 into line with the pivot-hole through said cheek-pieces the end of said extension is sprung toward the fork-shank, and then said pin $x$ is passed through the cheek-pieces and the end of said extension, as shown in Figs. 1 and 2. By this means the spring action of the extension 7 causes the under side of the guard 4 to be drawn against the upper edges of said cheek-pieces when the guard lies in the position shown in Fig. 1, and when said guard has its forward end turned upward to bring the ends of the guard-legs 5 to a position substantially at right angles to the shank of the fork the side of the guard adjoining said cheek-pieces swings on the rear corners thereof and is brought to a bearing against the rear ends of the cheek-pieces, which are in a line substantially at right angles to their upper edges, and thereby the guard, under the action of said spring-extension 7, is held to said position at right angles to the fork-shank. The spring action of said extension 7 is constant to force the guard against the cheek-pieces whether the guard be in the position shown in Fig. 1 or at right angles thereto, as above described.

The within-described fork-guard possesses peculiar advantages of construction, in that it is capable of being applied to the shank and cheek-pieces of a fork as ordinarily made without any especial change or adaptation of said parts of the fork to receive the guard.

The above-described swinging movement of the fork-guard to carry it from the position shown in Fig. 1 to one at right angles to the fork-shank, as above described, causes such a slight movement of the guard on the end of the spring-extension 7 that ordinarily the metal of which the guard is made possesses sufficient elasticity to permit of forming said spring-extension in the manner shown in Fig. 3; but when the metal of which the guard is made does not possess the requisite spring quality the guard is constructed as shown in Fig. 1 substantially, and the spring-extension 7, constructed from a suitable piece of spring-wire, is attached thereto, as above described.

What I claim as my invention is—

A fork guard having an elastic extension, 7, of its arm 6, the end of which extension passes through the guard, combined with a fork-shank having cheek-pieces thereon to and between which the end of said extension is pivotally connected, substantially as set forth.

FREDRICK C. FEICKER.

Witnesses:
EDWARD P. FEICKER,
J. ARTHUR WAINWRIGHT.